United States Patent
Parke

[15] 3,656,046
[45] Apr. 11, 1972

[54] POWER CONVERSION SYSTEM
[72] Inventor: Harry G. Parke, Brooklyn, N.Y.
[73] Assignee: Galbraith-Pilot Marine Corp., Brooklyn, N.Y.
[22] Filed: June 18, 1970
[21] Appl. No.: 47,314

[52] U.S. Cl. .................................. 320/59, 320/1, 321/45 R
[51] Int. Cl. ................................... H01m 45/05, H02m 7/44
[58] Field of Search ............ 321/45 R; 320/1, 39, 60, DIG. 2

[56] References Cited

UNITED STATES PATENTS

| | | | |
|---|---|---|---|
| 3,305,755 | 2/1967 | Walsh | 320/59 X |
| 3,543,130 | 11/1970 | Reijnders | 320/1 X |
| 3,211,964 | 10/1965 | Thorne | 320/1 X |
| 3,193,693 | 7/1965 | Daykin | 320/1 X |
| 3,259,829 | 7/1966 | Feth | 321/45 X |
| 3,252,070 | 5/1966 | Medlar et al. | 320/DIG. 2 |
| 3,316,476 | 4/1967 | Olson et al. | 321/45 |
| 3,403,295 | 9/1968 | De Coye De Castelet | 320/1 X |

Primary Examiner—J. D. Miller
Assistant Examiner—Robert J. Hickey
Attorney—Imirie and Smiley

[57] ABSTRACT

A circuit for obtaining power from a source and delivering a lower D.C. voltage to a load. A first silicon controlled rectifier is fired to charge up a series resonant circuit to approximately twice the input voltage. When the capacitor is fully charged, a signal fires a second silicon controlled rectifier to discharge the capacitor into the load. When the potential on the capacitor and its associated inductance has been reduced to the proper point, the second rectifier cuts off to end the cycle.

9 Claims, 3 Drawing Figures

Patented April 11, 1972

3,656,046

INVENTOR.
HARRY G. PARKE

BY
ATTORNEYS 3,656,046

POWER CONVERSION SYSTEM

BACKGROUND OF THE INVENTION

The present invention relates to power conversion circuits and more particularly to a battery charging and power supply circuit which uses either A.C. or D.C. voltage inputs and which delivers a lower D.C. voltage output to a load without the use of heavy transformers, motor generators, or similar devices.

Prior art battery chargers, or power supply circuits employ any one of a variety of means for replenishing the potential in a spent chemical battery, but all of these means have many disadvantages and shortcomings which make them not only expensive to construct, but also most inefficient and unwieldy in their operation. Additionally, these prior art devices will function with only one type input which adds to their undesirableness.

For example, these early systems may employ a full wave rectifier made up of two high current rectifier tubes and a heavy duty, multi-wound transformer to convert an A.C. input to D.C. for the load. Another system might have a bridge as a rectifying means, or else the system might utilize a transformer with high tension and low tension windings and an arrangement of vibrators or relays to switch potential between these windings. Still another storage battery charging system uses an A.C. generator which is driven by a variable speed prime mover.

SUMMARY OF THE INVENTION

The present invention provides many improvements over those prior art battery charging and power supply systems in that it is compact in size, inexpensive to construct, and will operate from either a D.C. or an A.C. input to transform power from one voltage level to another, over a wide range of load voltages.

Through the activation of a first electronic switch, a resonant circuit is charged to twice the input voltage, whereupon the first electronic switch opens and a second one closes to discharge the resonant circuit into a battery or other utilization device, to thereby transform power from one voltage level to another, over a wide range of load voltages, without the use of heavy transformers or other bulky apparatus.

DETAILED DESCRIPTION OF THE PREFERRED EMBODIMENT

Figure 1:
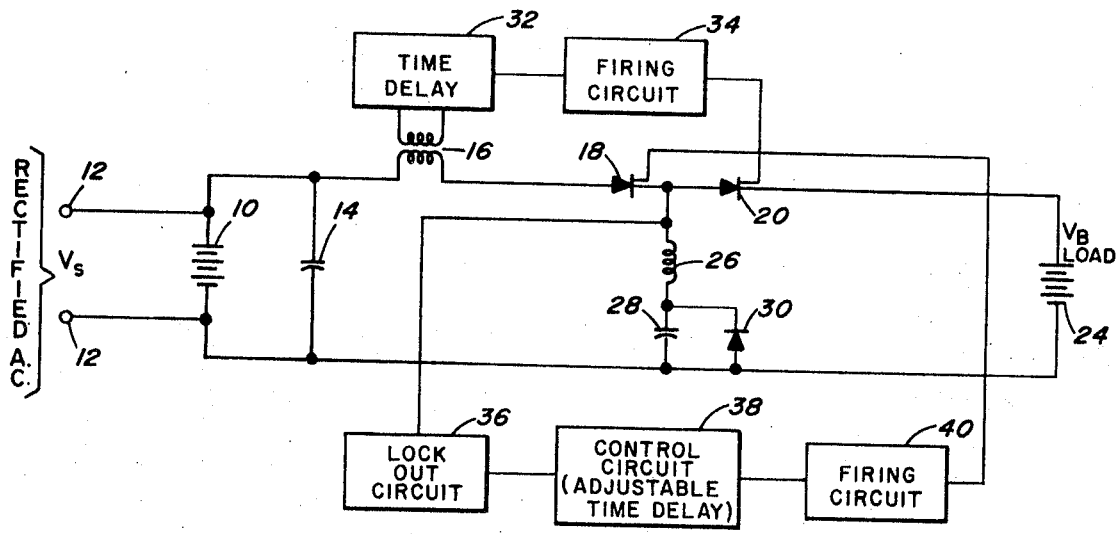
FIG. 1 is a schematic drawing of the invention.

Referring to FIG. 1, which shows a schematic drawing of the invention, there is shown a source of D.C. input potential 10, shown here as a battery but it should be recognized that the input could also be an A.C.**source and any form of rectifying device (not shown) which would connect to input terminals 12 without altering the invention. Connected across input potential 10 there is an adjustable capacitor 14 which may be necessary if the source of potential has a high A.C. impedance.

Also connected to the positive terminal of potential 10 is a saturable transformer 16, the output of transformer 16 being connected to the anode of a silicon controlled rectifier (hereinafter referred to as an SCR), or unidirectional switch 18. The cathode of SCR 18 forms a circuit connection with the anode of a second SCR 20, after which the potential is applied to the positive terminal of a load 24. Load 24 is shown herein as a battery, but it should be recognized that this representative only since the load can be any other utilization means which requires a voltage lower than the input voltage 10. The negative terminal of load 24 connects with the negative terminal of input potential 10.

Also connected to the cathode of SCR 18 (and therefore to the anode of SCR 20, also) there is a series resonant combination consisting of an inductance 26 and a capacitance 28, one plate of capacitance 28 being connected to the negative terminal of input 10 and load 24. A diode 30 is placed in parallel with capacitance 28 and poled so that it will conduct in the same direction as SCR 18.

The secondary winding of saturable transformer 16 forms an input to a time delay 32, whose output is connected to a firing circuit 34, the output of firing circuit 34 joining the gage electrode of SCR 20.

A firing and control loop is furnished for SCR 18 in the form of a lock-out circuit 36, a control circuit (adjustable time delay) 38 and firing circuit 40. The input of lock-out circuit 36 is connected to the junction of inductance 26 and the cathode of SCR 18 while the output of firing circuit 40 is tied to the gate of SCR 18.

Figure 2:
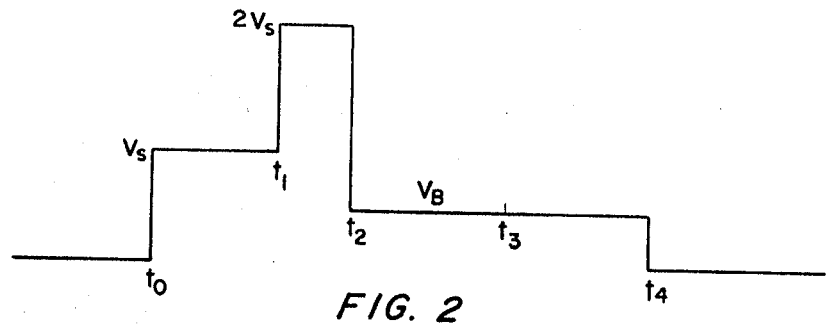
FIG. 2 is a chart of the voltage across the resonant circuit plotted against time.

The operation of the invention, as discussed below, will be more clearly understood when reference is made to FIGS. 2 and 3. At the beginning of the cycle of operation, at time $t_o$ for example, no voltage is present across charging capacitor 28. At time $t_o$, assume that control circuit 38 gives a signal to firing circuit 40 to fire SCR 18. As a consequence, the voltage across the series resonant combination 26 and 28, and as furnished by potential source 10 will rise very rapidly to the supply voltage potential, as indicated in FIG. 2. It is a characteristic of SCR's that once fired, they remain in conduction until the anode current reverses, and while fired, they present a very low, almost zero impedance. Consequently, the voltage across 26 and 28 will remain equal to the source voltage 10 during all of the time that SCR 18 is fired, as it shown by the horizontal line in FIG. 2. The voltage across capacitor 28 is initially zero and upon firing SCR 18, begins to charge up through the SCR and inductance 26.

As is well known to those skilled in the art, under these circumstances, with a series resonant combination, capacitor 28 will charge up to a voltage approximately twice the source voltage provided the losses in the inductance and capacitance are low. During all this period, diode 30 is back biased and therefore not conducting. When the voltage across capacitance 28 reaches a voltage twice the source voltage, current will attempt to reverse direction through inductance 26 and SCR 18, causing SCR 18 to block. This sudden decrease in current through transformer 16 will cause a collapsing field in its secondary winding, producing a signal which is applied to time delay 32. After an appropriate time delay, as from $t_1$ to $t_2$ (see FIG. 3), a signal from delay 32 will activate firing circuit 34 to fire SCR 20.

During the period of $t_1$ to $t_2$ there is no current flowing through inductance 26, and therefore, the voltage across both 26 and 28 will remain at twice the source voltage. When SCR 20 is fired, the voltage across the series combination 26, 28, as shown in FIG. 2, immediately drops to the load voltage $V_B$ and capacitor 28 begins to discharge to this voltage. If it were not for the action of diode 30, capacitor 28 would discharge to a voltage the negative to that which it had when SCR 20 was fired. However, as the voltage attempts to go negative, at time $t_3$, diode 30 conducts and prevents the voltage across capacitor 28 from actually reversing. During all this time, current is flowing through SCR 20 and therefore the voltage across series combination 26, 28 remains at the load voltage, as shown in FIG. 2. The voltage across 26, 28 will remain at this value until all the energy stored on inductor 26 has been delivered to load 24. At that point, the voltage across SCR 20 will reverse and current through it will attempt to reverse, causing SCR 20 to return to its blocking condition. At this point, conditions are now as they were at time $t_o$, that is, both switches SCR 18 and SCR 20 will be in open condition (blocked) and the voltage across both capacitor 28 and series combination 26, 28 will be zero.

It is important to the proper functioning of the invention that only one of the SCRs 18 and 20 be conducting at a time. This is secured by the other components of the circuit as shown by blocks. A time delay 32 prevents the firing of SCR 20 until the current through SCR 18 has reversed, as detected by a pulse of the correct polarity from the transformer 16 and a suitable time delay has occurred to permit SCR 18 to resume a blocking condition. This time delay is determined by circuit 32, which may be of any type known in the art. It will be clear from an examination of FIGS. 2 and 3 that whenever SCR 20 is closed, a voltage will exist across series combination 26, 28, and will in fact, be equal to the load voltage. To be certain that SCR 18 is not fired during the time that SCR 20 is still conducting, a lock-out circuit 36 is used to prevent firing of SCR 18 during this time.

Figure 3:
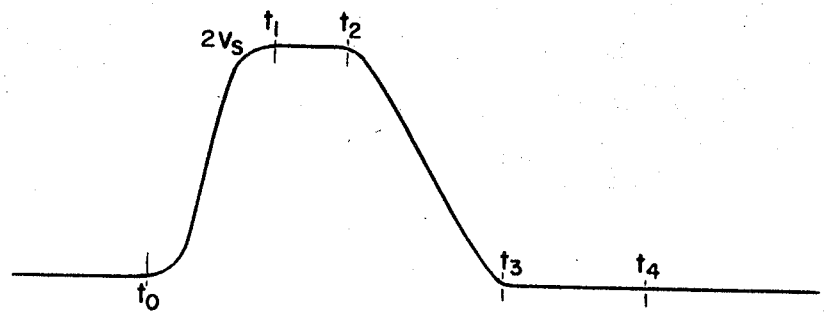
FIG. 3 is a chart of the voltage across the charging capacitor plotted against time.

It will be clear from an examination of FIGS. 2 and 3 that after SCR 18 has fired and extinguished and a voltage equal to twice the source voltage $V_S$ has been stored in capacitance 28, the energy stored in 28 will be $2CV_S^2$, where C is the capacity of capacitance 28. All of this energy, except for losses, is delivered into the load 24. Therefore, if the operation described above occurs N times per second, the power delivered to load 24 will be $2NC V_S^2$ and the current delivered to the load will be $2NC V_S^2/V_B$. It is therefore possible to control the power and current output of the invention by varying N. This can be controlled by varying the delay between the time that voltage disappears from across series combination 26, 28, that is to say at time $t_4$, and the time that SCR 18 fires again, at time $t_0$. As shown in FIG. 1, a control circuit with adjustable time delay 38 may be used for this purpose.

The time delay may be controlled either by manual adjustment, or by a feedback signal proportional to the current, or a feedback circuit proportional to the output voltage, or other means known in the art. The control by the output voltage or current is particularly suitable for battery chargers. Direct control from a manual input results in a supply with a constant power output, regardless of small charges of load voltage.

From the above description of the structure and operation of the invention, it is clear that there is disclosed a device which offers material improvement and advancement over the disadvantages and shortcomings of similar units. The invention provides a power conversion system which efficiently operates as a battery charger or a power supply, and one which functions from either A.C. or D.C. input to provide power from one voltage level to another without the use of heavy transformers, while still operating over a wide range of load voltages.

It is obvious that many modifications and variations of the present invention are possible in the light of the above teachings. It is therefore to be understood that within the scope of the appended claims, the invention may be practiced otherwise than as specifically described.

I claim:
1. A power conversion system comprising:
   a source of input voltage;
   sensing means in said system connected to the source of input voltage and responsive to changes in current;
   first and second uni-directional switches in series with the sensing means;
   a series resonant circuit consisting of an inductance and a capacitance positioned across the voltage source and connected to the junction of the first and second uni-directional switches;
   a diode connected in parallel across said capacitance;
   first means for activating the first uni-directional switch;
   second means for activating the second uni-directional switch; and
   a load connected between the output of the second uni-directional switch and one end of the resonant circuit;
   at least one of said first and second means deriving timing signals for said activation from said sensing means.

2. The power conversion system of claim 1, wherein the source of input voltage may be either A.C. or D.C.

3. The power conversion system of claim 2, where the means responsive to changes in current is a transformer.

4. The power conversion system of claim 3, wherein the uni-directional switches are silicon controlled rectifiers.

5. The power conversion system of claim 4, wherein the second means includes:
   a time delay connected to the transformer;
   a firing circuit activated by the time delay; and,
   means connecting the firing circuit with the gate electrode of the second uni-directional switch.

6. The power conversion system of claim 5, wherein the first means includes:
   a lock-out circuit connected to the junction of the first and second uni-directional switches;
   a control circuit with adjustable time delay connected to the output of the lock-out circuit;
   a firing circuit connected to the output of the control circuit; and,
   means connecting the firing circuit with the gate electrode of the first uni-directional switch.

7. The power conversion system of claim 6, wherein the load is a battery.

8. The power conversion system of claim 7, wherein the diode is poled so as to deliver current through the load.

9. A battery charging system for transferring power into a battery at a lower level than the input voltage comprising:
   a source of D.C. voltage;
   a battery to be charged;
   first and second SCR's connected in series between the D.C. source and the battery;
   a series connected single inductance and capacitance positioned in parallel with the D.C. source and the battery and connected to a point between said first and second SCR's;
   first control means for activating the first switch to charge the capacitance;
   second control means for activating the second switch to discharge the capacitance into the battery when the first switch is deactivated;
   current sensing means in said system for deriving timing signals for firing said SCR's; and
   a diode connected across said capacitance to present inverse charging thereof.

* * * * *